Jan. 3, 1956 H. MAYNARD 2,729,417
RETRACTABLE LASHING OR LIKE ATTACHMENT DEVICE
Filed July 3, 1953 2 Sheets-Sheet 1

Inventor
HARRY MAYNARD
By Richardson, David and Nordon
his Attorneys.

Jan. 3, 1956  H. MAYNARD  2,729,417
RETRACTABLE LASHING OR LIKE ATTACHMENT DEVICE
Filed July 3, 1953  2 Sheets-Sheet 2

Inventor
HARRY MAYNARD
By Richardson, David and Nordon
his Attorneys.

United States Patent Office 2,729,417
Patented Jan. 3, 1956

2,729,417

RETRACTABLE LASHING OR LIKE ATTACHMENT DEVICE

Harry Maynard, Hull, England, assignor to Blackburn and General Aircraft Limited, Brough, East Yorkshire, England, a British company Application July 3, 1953, Serial No. 366,019

Claims priority, application Great Britain March 18, 1953

2 Claims. (Cl. 248—361)

This invention relates to lashing and like attachment devices and is particularly concerned with such devices provided in a compartment of an aircraft or in some other movable vehicle to form an anchorage to which a lashing or other securing means may be connected.

The object of the present invention is to provide such an attachment device which may be readily retracted from a projecting operative position to a position lying flush or substantially flush with the ambient surface without requiring the use of any special tool.

To this end, according to the invention, the attachment member is formed integrally with a spring loaded hollow sleeve capable of limited axial displacement in the bore of a holding member and freely movable elements extending through the walls of the hollow sleeve are biased by an externally operable spring loaded member to engage in a groove in the holding member to retain the attachment member in retracted position with its end flush or substantially flush with the end of the holding member. The freely movable elements conveniently take the form of balls.

The attachment device conveniently comprises a pair of projecting lugs between which may be placed a part to be retained as by a bolt or the like extending through apertures in the lugs. In such an arrangement, the externally operable device controlling the latching element or balls is disposed between such lugs and has a part extending through the base therebetween to engage with a spring loaded ball controlling member. To retract this device it is merely necessary to depress the lugs when the externally operable member will occupy the space therebetween and form a substantial unbroken surface. To extend the attachment device it is merely necessary to depress the operating member when the lugs will be caused to project under the influence of the spring provided for that purpose.

Now in order that the invention may be clearly understood and readily carried into effect, embodiments thereof are by way of example hereinafter more fully described and shown in the accompanying drawings, which are given for purposes of illustration only and not of limitation.

Figure 1:
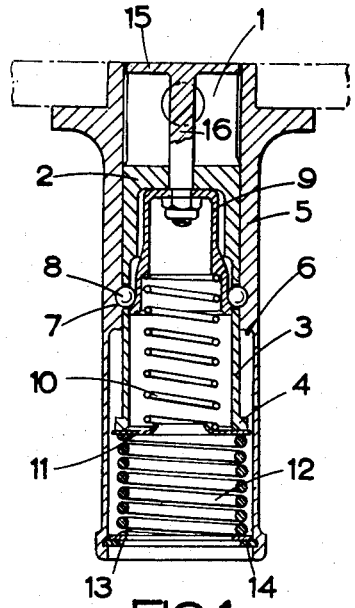
Figure 3:
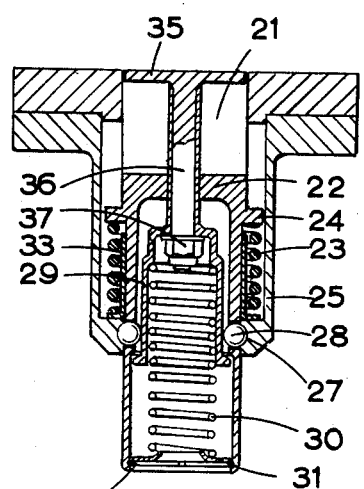
Figure 2:
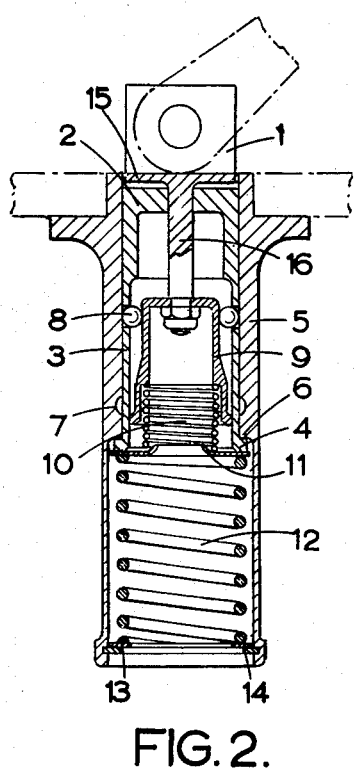
Figure 4:
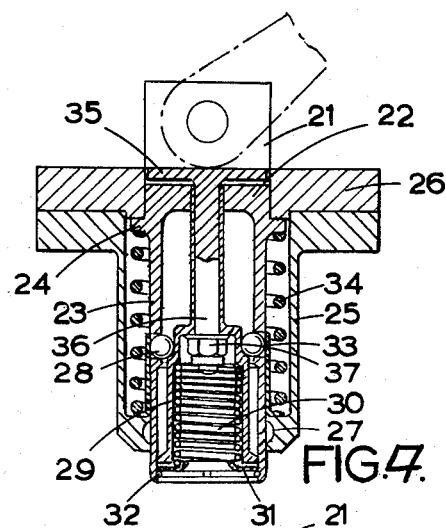
Figure 5:
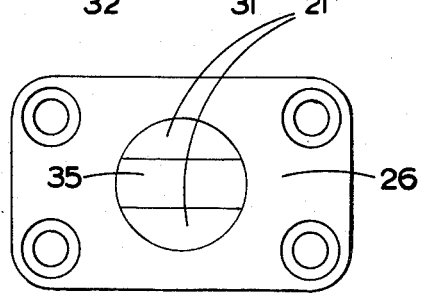
Figure 6:
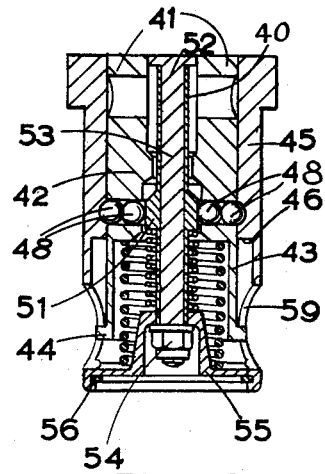
Figure 7:
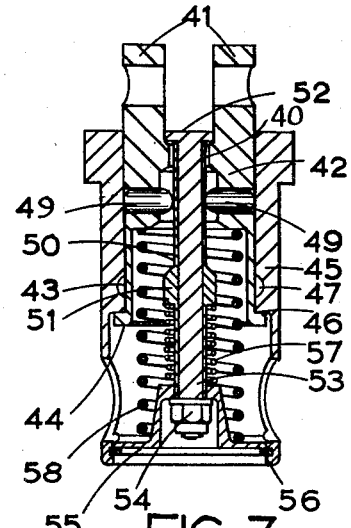
Figure 8:
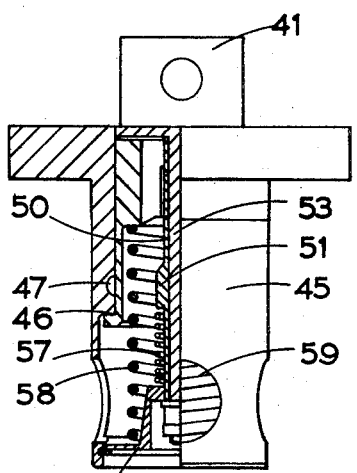
Figure 9:
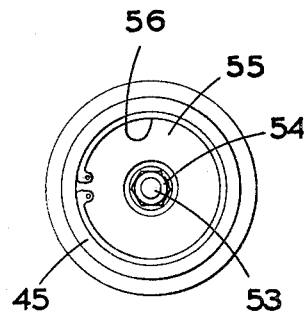

In these drawings:

Fig. 1 is a section through one form of the device showing the position of the parts with the attachment device in retracted position, Fig. 2 is a similar view with the attachment device projecting in its operative position, Fig. 3 is a view similar to Fig. 1 showing a modified construction of the device retracted, Fig. 4 is a view of the device of Fig. 3 with its attachment member in extended position, Fig. 5 is a plan view looking down on Fig. 3, Fig. 6 is again a view similar to Fig. 1 showing yet another construction of the device, Fig. 7 is a view of a modification of the device of Fig. 6 in extended position, Fig. 8 is a half-sectioned side elevation as seen from the side of Fig. 7, and Fig. 9 is an under plan view.

Referring now to the said drawings and in particular to Figs. 1 and 2 thereof, the device comprises a pair of lugs 1, forming the attachment member, which are integral with a connecting portion 2, which is extended as a tube 3 at the mouth of which is an external flange 4. This part is slidable in a tubular holding member 5, which is formed in two internal diameters to provide a step 6. A peripheral groove 7 is provided in the internal wall of the smaller diameter portion of the holding member 5.

A plurality of freely movable balls 8 extend through the wall of the sleeve 3 and are acted on by a member 9, which is externally so shaped in one position to allow the balls 8 to sink below the surface of the tube 3 as in Fig. 2 and in its alternative position to project proud thereof, as in Fig. 1. A spring 10 effective to displace the member 9 is disposed between that member and a plate 11 on the end of the sleeve 3, which plate is retained by a spring 12 between such plate 11 and a plate 13 retained at the end of the holding member 5 by a circlip 14.

An externally operable part 15 is disposed between the pair of lugs 1, and this member has a rod 16 extending through the part 2 to engage fast with the member 9.

On retraction of the attachment member comprised by the lugs 1, the parts occupy the position shown in Fig. 1 with the extremities of the lugs 1 and the operating member 15 flush or substantially flush with the end of the holding member 5, at which time the balls 8 are caused to project through the sleeve 3 to engage in the groove 7 and so hold the attachment member retracted.

To extend the lugs 1 into operative position, as shown in Fig. 2, it is merely necessary to depress the externally operable member 15 thereby displacing the part 9 against the spring 10, at which time the balls 8 may move inwardly and the spring 12 will become effective to displace the sleeve 3 upwardly into the position shown in Fig. 2, when outward movement of the sleeve 3 is prevented by the flange 4 engaging the step 6.

Illustrated in Figs. 3 to 5 is a modified construction of device, which is essentially similar to that previously described as regards its general construction and function but which is of more compact design. In this embodiment a pair of lugs 21 are integral with a portion 22 which is extended as a tube 23 which has an external peripheral flange 24 intermediate its length. This part is slidable in a tubular holding member 25 surmounted by end plate 26 having a reduced diameter bore therein. The other end of the tubular holding member 25 is formed thicker and provided with a peripheral groove 27. A plurality of freely movable balls 28 extend through the wall of the sleeve 23 and are acted upon by a member 29 which is externally so shaped in one position to allow the balls 28 to sink below the surface of the tube 23 as in Fig. 4 and in its alternative position to cause them to project proud thereof as in Fig. 3 and make latching engagement in the groove 27.

A spring 30 effective to displace the member 29 is disposed between that member and a plate 31 which is retained by a circlip 32 at the end of the tube 23. A flanged sleeve 33 is disposed around the tube 23 and a spring 34 is disposed to be effective between the flange of that sleeve and the flange 24 of the tube 23 to hold the flange of such sleeve against the enlarged end of the holding member 25 and to urge the tube 23 towards its projecting position in which its movement is limited by its flange 24 contacting the end plate 26.

An external operable part 35 is disposed between the pair of lugs 21 and this member has a rod 36 made fast to the member 29 as by means of the nut 37. To bring the device into operative position from the position of its part shown in Fig. 3 it is only necessary to depress the member 35 with the consequent displacement of the member 29 to allow the balls to move inwardly and so escape from the groove 27 whereupon the spring 34 becomes effective to move the sleeve 23 upwardly for the lugs 21 to project in their extended operative position as shown in Fig. 4.

In the modified constructions illustrated in Figs. 6 to 9, the attachment device again comprises a pair of lugs 41 which are integral with the connecting portion 42 which is extended as a tube 43, the mouth of which has an external flange 44. This part is slidable in a tubular holding member 45 which is formed in two internal diameters to form a step 46. A peripheral groove 47 is provided in the smaller diameter portion of the holding member 45.

A plurality of freely moving elements extend through the thick wall portion of the sleeve 43. These elements may comprise a pair of balls 48 as shown in Fig. 6 or they may comprise slidable members 49 having rounded ends as shown in Fig. 7. The devices of Figs. 6 and 7 are otherwise identical in structure and operation. The inner balls 48 or inner ends of the slidable members 49 are acted upon by a tubular member 40 which is formed with an external peripheral cam flange 51. This arrangement is such that normally the freely movable elements 48, 49 may sink below the external surface of the sleeve 43 but on appropriate positioning of the parts, the cam 51 will move the same outwardly for the outer balls 48 or the outer ends of the members 49 to make latching engagement in the groove 47.

The externally operable member 52 is fast with a rod 53 which extends through the tube 50 and is made fast thereto by means of a nut 54. The lower end of the tube 50 extends through the end closure member 55 which is held in position at the end of the holding member 45 by a circlip 56. A spring 57 is arranged between the cam flange 51 and this end closure member 55 to tend to move the tube 50 in upward direction. Likewise a spring 58 extends between such end closure member and the portion 42 to tend to move the latter upwardly to cause the lug 41 to project as in Fig. 7, in which position movement is limited by the flange 44 abutting the step 46. Apertures 59 may be provided in the holding member 45 to permit the escape of dirt or moisture which may enter the device.

To bring the lugs 41 from their retracted position to their extended position it is merely necessary to depress the externally operable member 52 so moving the cam flange 41 below the freely movable elements i. e., the balls 48 in Fig. 6 or slidable members 49 in Fig. 7 so that the same may move inwardly and allow the spring 58 to move the part 42 upwardly in the position shown in Figs. 7 and 8. To retract the device, the lugs 41 are depressed with the result that the freely movable elements 48 or 49 on engaging the cam flange 51 move the tube 50 also downwardly until such elements may enter the groove 47 whereupon the spring 57 raises the tube 50 for its cam flange 51 to move the elements 48 or 49 outwardly and hold them in latching engagement with such groove to retain the lugs 41 retracted with their ends flush with the end of the holding member 45.

As illustrated in the drawings the lugs 1, 21, 41 are apertured so that a part to be held thereby may be placed therebetween or to one or both sides thereof to be secured by a bolt passed through the apertures, but the lugs could be externally threaded to engage with a correspondingly threaded separable member, and other changes may be made in the form of the attachment member constituted by such lugs without departing from the invention claimed.

What I claim is:

1. An anchorage to which a lashing and like securing means may be connected, comprising a retractable member provided with a pair of lugs interconnected at their bases and extended as a tubular sleeve, a plurality of balls freely movable in radial bores provided in said sleeve, an external flange on the end of said sleeve, a holding member having a two diameter bore and provided with a peripheral groove formed in the wall of said bore, an externally operable member disposed between the lugs and having a part extending through the interconnecting portion thereof, a cam member, means for connecting said part to said cam member, a spring effective on said cam member, and a further spring effective on said retractable member to urge it towards extended operative position in which it is held by said external flange abutting the end of said smaller diameter bore of the holding member and on its retraction said cam member urges said balls into latching engagement with said groove in the holding member.

2. An anchorage to which a lashing and like securing means may be connected, comprising a retractable member provided with a pair of lugs interconnected at their bases and extended as a tubular sleeve, a plurality of balls freely movable in radial bores provided in said sleeve, an external flange intermediate the length of said sleeve, a holding member having a bore therein to contain said retractable member for sliding movement and further having an end plate, a thicker portion at an end of said holding member and provided with a peripheral groove, an externally operable member disposed between the lugs and having a part extending through the interconnecting portion thereof, a cam member, means for connecting said part to said cam member, a spring effective on said cam member to urge said balls into latching engagement with said groove, and a further spring effective on said retractable member to urge it towards extended operative position in which it is held by said external flange abutting said end plate on the holding member.

References Cited in the file of this patent

UNITED STATES PATENTS

| | | |
|---|---|---|
| 1,488,031 | Bridgwood | Mar. 25, 1924 |
| 2,413,450 | Johnsen | Dec. 31, 1946 |
| 2,435,444 | Johnson | Feb. 3, 1948 |
| 2,521,516 | Heidman et al. | Sept. 5, 1950 |
| 2,562,459 | Hoey | July 31, 1951 |
| 2,621,005 | Turpin | Dec. 9, 1952 |